3,055,930
NEW BENZOPHENONE SULPHONIC ACID AMIDES
Wilfried Graf, Binningen, and Erich Schmid and Willy G. Stoll, Basel, Switzerland, assignors to Geigy Chemical Corporation, Ardsley, N.Y., a corporation of Delaware
No Drawing. Original application Feb. 26, 1959, Ser. No. 795,616. Divided and this application Feb. 14, 1961, Ser. No. 99,002
Claims priority, application Switzerland Nov. 4, 1957
12 Claims. (Cl. 260—470)

The present invention concerns new benzophenone sulphonamides which have valuable pharmacological properties, as well as processes for the production thereof.

It has surprisingly been found that benzophenone sulphonamides of the general formula

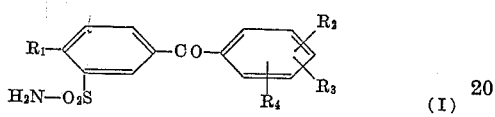

(I)

wherein:

$R_1$ represents a member selected from the group consisting of chlorine, bromine, amino, lower alkyl and lower alkoxy radicals, $R_2$ represents a member selected from the group consisting of hydrogen, chlorine, bromine, carboxyl, lower alkyl, lower alkoxy, lower carbalkoxy, carboxy-lower alkoxy, carbamyl radicals of the formula

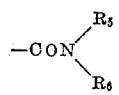

carbamyl-lower alkoxy radicals of the formula

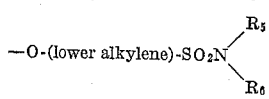

and sulphamyl radicals of the formula

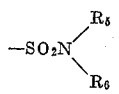

$R_3$ represents a member selected from the group consisting of hydrogen, chlorine, bromine, nitro, hydroxy, lower alkyl, lower alkoxy, carboxyl, lower carbalkoxy, carboxy-lower alkoxy, amino, lower alkanoylamino radicals, carbamyl radicals of the formula

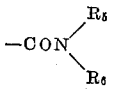

carbamyl-lower alkoxy radicals of the formula

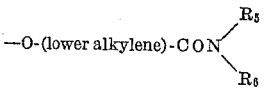

and sulphamyl radicals of the formula

$R_4$ represents a member selected from the group consisting of hydrogen, chlorine, bromine, lower alkyl and lower alkoxy radicals and each of $R_5$ and $R_6$ taken separately represents a member selected from the group consisting of hydrogen, a lower alkyl, lower alkenyl, lower hydroxyalkyl, and $R_5$ and $R_6$ jointly and together with the corresponding nitrogen atom represent a member selected from the group consisting of pyrrolidino, piperidino and morpholino radicals have excellent diuretic activity, i.e. they can be used to promote the excretion of water and sodium chloride that have accumulated in excess in the interstitial tissues or serious cavities. In this respect the ratio of ions excreted is very favourable for therapeutical purposes in that, for example, the amount of potassium excreted is slight compared with that of sodium and, on the other hand, the great amount of sodium eliminated is accompanied by a considerable increase in the amount of chlorine and water eliminated. Some of the compounds defined above are suitable also as intermediate products for the production of other diuretic substances.

The compounds defined above are produced by reacting a benzophenone sulphonic acid derivative of the general formula

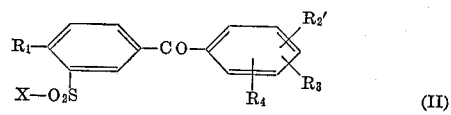

(II)

wherein:

X represents chlorine and bromine and $R_2'$ represents a radical corresponding to the definition of $R_2$ or a chloro- or bromo- sulphonyl or carbonyl radical, and $R_1$, $R_3$ and $R_4$ have the meanings given above, with ammonia.

Starting materials of the general Formula II can be produced by various methods known per se. The 3-halogen sulphonyl group can be introduced into 4-substituted benzophenones to produce starting materials of the general Formula II for example by sulphonating and reacting the sulphonic acid obtained with a suitable mineral acid halide; it can be introduced direct by reacting with chlorosulphonic acid; or it can be introduced by nitrating, reducing the nitro group, diazotising the amino group obtained and decomposing the diazonium halide with sulphur dioxide in the presence of copper salts such as copper chloride. In such reactions, naturally the second phenyl radical often becomes substituted, or any substituents thereof which were already present are modified. For example a nitro group already present in the second phenyl radical can be converted simultaneously with the nitro group introduced into the 3-position, into a chlorosulphonyl radical. On reacting such starting products containing two chlorosulphonyl groups with ammonia, end products are obtained in which there are two unsubstituted sulphamyl groups.

Starting materials of the general Formula II for the production of end products having a substituted sulphonamide group $R_2$ can be obtained for example by modifying a nitro group already present in the second phenyl radical into a chlorosulphonyl group in the same way before the nitro group in the 3-position is introduced. The nitration can then be performed, then the chlorosulphonyl group of the second phenyl radical can be modified into a sulphamyl group substituted as defined by reacting with a suitable aliphatic amine and thereafter the nitro group in the 3- position can be converted in the manner described above into a chlorosulphonyl group. As amines which are suitable for the reaction with the chlorosulphonyl group of the second phenyl radical, may be named methylamine, ethylamine, isopropylamine, n-butylamine, allylamine, β-hydroxy-ethylamine, β-hydroxy-propylamine, dimethylamine, diethylamine, di-n-butylamine, diallylamine and bis-(β-hydroxy-ethyl)-amine, pyrrolidine, piperidine and morpholine.

In particular, starting materials for compounds having two unsubstituted sulphamyl groups can be obtained for example by treating suitably substituted benzophenones with chlorosulphonic acid to introduce a halogen sulphonyl group into each of the 3- and 3'-positions, or by first sulphonating or nitrating such benzophenones in these two positions and converting the substituted benzophenone-3.3'-disulphonic acids or substituted 3.3'-dinitrobenzophenones obtained by methods given above into substituted 3.3'-bis-chlorosulphonyl benzophenones.

A further valuable group of starting materials are obtained if halogen or alkyl benzenes are reacted according to Friedel Crafts with possibly substituted phthalic acid anhydrides, the 4-halogen- or 4-alkyl-2'-carboxybenzophenones obtained are nitrated and the 4-substituted 3-nitro-2'-carboxybenzophenones are converted by methods given above into 4-substituted 3-chlorosulphonyl-2'-carboxybenzophenones or into 4-substituted 3-chlorosulphonyl-2'-chlorocarbonylbenzophenones.

Numerous variations in the substitution of the second phenyl radical as well as in the production of starting materials in which this radical is unsubstituted, are enabled by the condensation of 4-substituted 3-nitro benzoic acid halides with benzene which can possibly be substituted according to the definitions for $R_2$, $R_3$ and $R_4$.

The ways described above by no means exhaust the possibilities for the production of suitable starting materials of the general Formula II by methods known per se. The following compounds are given as examples of starting materials:

4-chloro-benzophenone-3-sulphochloride and -3-sulphobromide,
4-chloro-4'-methyl-benzophenone-3-sulphochloride,
4-chloro-2'.4'-dimethyl-benzophenone-3-sulphochloride,
4-chloro-2'-carboxy-benzophenone-3-sulphochloride,
4-chloro-2'-carbethoxy-benzophenone-3-sulphochloride,
4-methyl-2'-chlorocarbonyl-benzophenone-3-sulphochloride,
4-chloro-4'-nitro-benzophenone-3-sulphochloride,
4-isopropyl-benzophenone-3-sulphochloride,
4-chloro-4'-sulphamyl-benzophenone-3-sulphochloride,
4-chloro-benzophenone-3.4'-disulphochloride,
4-bromo-benzophenone-3.4'-disulphochloride,
4-methyl-benzophenone-3.4'-disulphochloride,
4.4'-dichloro-benzophenone-3.3'-disulphochloride,
4.4'-dimethoxy-benzophenone-3.3'-disulphochloride,
4-isopropoxy-4'-methyl-benzophenone-3.3'-disulphochloride,
4-chloro-4'-amino-benzophenone-3.3'-disulphochloride,
4-chloro-2'.4'-dimethyl-benzophenone-3.5'-disulphochloride, and
4-chloro-3'.4'-dichloro-benzophenone-3-sulphochloride.

A further process for the production of the benzophenone sulphonamides of the general Formula I defined above, with the exception of those compounds in which $R_1$ and/or $R_3$ represent amino groups, consists in treating compounds of the general formula

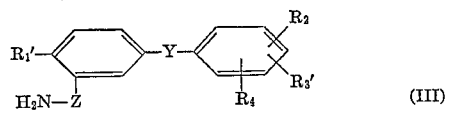

with oxidising agents, e.g. with potassium permanganate solution. In the above formula Y represents $CH_2$— or CO—,
Z represents S or —$SO_2$—, but at least one of these two symbols must represent the oxidisable radical, i.e. —$CH_2$— or —S— respectively, and $R_1'$ and $R_3'$ correspond to the definitions given above for $R_1$ and $R_3$ with the exception of amino groups, and
$R_2$ and $R_4$ have the meanings given above.

Examples of starting materials of the general Formula III are 3-sulphamyl-4-chloro-2'-carbamyl-diphenylmethane, 3-sulphamyl-4-chloro-diphenylmethane and 3-aminosulphenyl-4-chloro-diphenylmethane. These and other compounds are obtained from the corresponding 4-substituted 3-halogen sulphonyl-diphenylmethanes, 3-halogen sulphenyl-benzophenones or 3-halogen sulphenyl diphenylmethanes by reacting with ammonia analogously to the first process mentioned for the production of compounds of the general Formula I. In addition, 3-amino sulphenyl compounds are also obtained by treating 3-mercapto compounds with ammoniacal chlorine or bromine lyes provided end products are desired which contain no carbamyl groups as substituents.

As has already been mentioned above, compounds of the general Formula I can also be used as intermediate products. In particular, compounds of this general formula in which $R_3$ is a nitro group or $R_3$ and/or $R_1$ are amino groups, or $R_2$ and/or $R_3$ are methyl groups, can be converted into other compounds which correspond to the general Formula I. For example, compounds of the general Formula I in which $R_3$ represents a nitro group whilst $R_1$, $R_2$ and $R_4$ have the meanings given above, can be reduced to compounds having an amino group as $R_3$. Such compounds as well as those having an amino group $R_1$ can be converted into diazonium salts which can be further reacted according to the various known methods. Examples of such reactions are the conversion of the diazonium halides into corresponding halogen compounds ($R_3$ and/or $R_1$=halogen, in particular chlorine) or into cyano compounds by treatment of their solutions with cuprohalide, copper powder or potassium cuprocyanide; the decomposition of diazonium salts, e.g. of sulphates, with water or diluted mineral acids to form the corresponding hydroxyl compounds ($R_3$=OH) or with low molecular alkanols to form alkoxy compounds ($R_3$ and/or $R_1$=alkoxy groups); the replacement of the diazonium group by hydrogen by treatment of the diazonium salts with aqueous sodium hypophosphite solution, with formic acid, formamide, dimethyl formamide or with an alcohol.

All the above conversion products, with the exception of the cyano compounds, still fall under the general Formula I. Also, compounds again corresponding to the general Formula I with a carbamyl or carboxyl group as $R_3$ or $R_2$ are obtained by partial or complete hydrolysis of the cyano compounds. In addition, suitable diazonium chlorides can be converted analogously to the production of starting materials of the general Formula II on treatment with sulphur dioxide into sulphochlorides and these latter can be reacted with ammonia or suitable aliphatic amines, i.e. low molecular mono- and di-alkylamines, monoalkanolamines, dialkanolamines or N-alkyl-alkanolamines to form compounds which possibly have a substituted sulphamyl group $R_2$. Finally, for example compounds in which $R_2$ and/or $R_3$ is/are (a) methyl group(s) and in which $R_1$ is advantageously a halogen atom can be oxidised, for example with potassium permanganate solutions, to form corresponding compounds having one or two carboxyl groups and then, if desired, one of the two carboxyl groups can be split off by heating.

In addition, compounds with an amino group $R_3$ can be converted by reaction with low molecular fatty acids or reactive functional derivatives thereof into compounds with one low molecular alkanoylamino group $R_3$.

Compounds of the general Formula I in which $R_1$ is chlorine or bromine are distinguished by their good activity and the easiness with which they are produced. Compounds which can be used direct as diuretics contain, preferably, also the sulphamyl group, chlorine atoms and low molecular alkyl or alkoxy groups as $R_2$ and hydrogen, chlorine atoms and lower molecular alkyl and alkoxy groups as $R_3$. Compounds in which $R_2$ is a nitro group or $R_3$ or $R_1$ is an amino group are, on the other hand, particularly valuable as intermediate products.

The compounds of the general Formula I are distinguished not only by great diuretic activity but also by their very slight toxicity and thus a very favorable therapeutical index. They can be administered for example for the treatment of congestive heart failure and other ailments accompanied by water retention in dosages of 50–200 mg. once to three times daily, i.e. in all, 50–600 mg. daily, per os.

*Example 1*

24.6 parts of 3.4'-diamino-4-chloro-benzophenone are dissolved in 100 parts of glacial acetic acid by warming to about 75° and, after the addition of 85.2 parts of hydrochloric acid 37.5%, the solution is cooled to 5°. The crystal slurry so obtained is then diazotised at 5–10° within 15 minutes by the dropwise addition of 30 parts by volume of aqueous sodium nitrite solution of 46 vol. % while cooling with ice, whereupon a pale yellow solution of the bis-diazonium salt is formed. This is poured within 2 minutes into an ice cooled mixture of 400 parts by volume of a 30% solution of sulphur dioxide in glacial acetic acid, 1 part of crystallised cupric chloride and 10 parts of water. The exothermic reaction causes the temperature to rise to about 10° and nitrogen is quickly generated. After one hour, about 2 to 3 times the volume of water is added to the solution obtained whereupon the 4-chlorobenzophenone-3.4'-disulphochloride precipitates in the form of a viscous mass which solidifies in crystalline form. After washing with water it is dissolved in about 100 parts by volume of chloroform and the solution is poured into a mixture of 150 parts by volume of aqueous concentrated ammonia and 150 parts by volume of alcohol. After 1 hour, steam is introduced into this mixture until the solvent and excess ammonia have disappeared. The 4-chloro-benzophenone-3.4'-disulphonamide generally precipitates in an oily form and, on standing, crystallises. It is purified by recrystallisation from alcohol. Melting point 201–202°.

*Example 2*

A mixture of 23.2 parts of 4'-amino-4-chloro-benzophenone, 200 parts of glacial acetic acid, 22 parts of 37% hydrochloric acid and 40 parts of ice are diazotised at 5–10° within 5 minutes with 15 parts of 46% sodium nitrite solution. The solution of the diazonium salt so obtained is poured at 10° and within 2 minutes into a mixture of 200 parts of 30% solution of sulphur dioxide in glacial acetic acid and 2 parts of crystallised cupric chloride in 10 parts of water. The exothermic reaction causes the temperature to rise to about 25° and nitrogen is quickly generated. After a short time, the 4-chloro-benzophenone-4'-sulphochloride crystallises out. It is filtered off, washed with water, then dissolved in chloroform, dried with Siccon and isolated by evaporating off the chloroform. Melting point 112–114°.

31.5 parts of 4-chloro-benzophenone-4'-sulphochloride are dissolved in 100 parts of sulphuric acid monohydrate and the solution is nitrated within two hours at −5° to 0° with 13.9 parts of 50% nitrating acid (density 1.73). After standing for 14 hours at 0–5°, the solution is poured into 200 parts of water and 200 parts of ice, whereupon the 4-chloro-3-nitro-benzophenone-4'-sulphochloride precipitates as a viscous mass which crystallises on stirring. It is filtered off, washed with water and dissolved in 200 parts of chloroform. To convert into an amide, this solution is poured at room temperature into a mixture of 100 parts of concentrated aqueous ammonia and 120 parts of alcohol. After standing for 1 hour at 45°, the solution is evaporated to dryness in the vacuum. The remaining 4-chloro-3-nitro-benzophenone-4'-sulphonamide is washed with water and recrystallised from alcohol. M.P. 166–169°.

30.9 parts of 4-chloro-3-nitro-benzophenone-4'-sulphonamide are added within 2 hours while stirring well to a boiling mixture of 25 parts of ground cast iron filings, 2.5 parts of 37% hydrochloric acid, 150 parts of water and 120 parts of alcohol. The reduction mixture is refluxed for another two hours, then the reaction is made weakly phenolphthalein alkaline with caustic soda lye, the mixture is filtered hot and the residue is extracted by boiling several times with alcohol. The combined filtrates are concentrated and left to crystallise on cooling. The 4-chloro-3-amino-benzophenone-4'-sulphonamide so obtained melts at 176–178°.

A mixture of 31.1 parts of 4-chloro-3-amino-benzophenone-4'-sulphonamide, 180 parts of glacial acetic acid and 25 parts of 37% hydrochloric acid is diazotised within 5 minutes at 5–10° by the addition of 15 parts of aqueous 46% sodium nitrite solution. The solution of the diazonium salt so obtained is poured within 2 minutes at 0° into a mixture of 200 parts of 30% solution of sulphur dioxide in glacial acetic acid, 10 parts of water and 2 parts of crystallised cupric chloride. The exothermic reaction causes the temperature to rise to about 10° and nitrogen is developed. After about 15 minutes, the 4-chloro-4'-sulphamyl-benzophenone-3-sulphochloride begins to crystallise out. After 1 hour, it is filtered off, washed with water and dried in the desiccator. M.P. 188–191°.

39.4 parts of 4-chloro-4'-sulphamyl-benzophenone-3-sulphochloride are added to a mixture of 100 parts of aqueous 25% ammonia solution and 20 parts of alcohol. The temperature rises from 10 to 20° and a clear solution is formed. The alcohol and excess ammonia are then distilled off in the vacuum and the 4-chloro-benzphenone-3.4'-disulphonamide crystallises out. After recrystallisation from water or alcohol, it melts at 201–202°.

*Example 3*

15 parts of aqueous 46% sodium nitrite solution are gradually added to a mixture of 27.5 parts of 4-chloro-3-amino-benzophenone-2'-carboxylic acid, 200 parts of glacial acetic acid and 20 parts of 37% hydrochloric acid at 0–10°. The solution of the diazonium salt is poured into an ice-cooled mixture of 200 parts of 30% sulphur dioxide solution in glacial acetic acid and 3 parts of crystallised cupric chloride in 15 parts of water. Nitrogen is developed and, after a short time, the 4-chloro-2'-carboxy-benzophenone-3-sulphochloride crystallises out. After 1 hour it is filtered off and washed with water. M.P. 178–182°.

35.9 parts of 4-chloro-2'-carboxy-benzophenone-3-sulphochloride are added to 240 parts of aqueous 25% ammonia solution and 120 parts of ice. On acidifying the solution obtained, the 4-chloro-2'-carboxy-benzophenone-3-sulphonamide precipitates, first generally in an oily form which later crystallises. On recrystallising from water, it melts at 223°.

*Example 4*

29.1 parts of 4'-amino-4-methyl-benzophenone-3-sulphonic acid, which is easily attainable by sulphonating 4'-nitro-4-methyl-benzophenone and then reducing the nitro group, are suspended in 100 parts of water, 25 parts of glacial acetic acid and 20 parts of 37% hydrochloric acid and the suspension is diazotised at 10–15° by the gradual addition of 15 parts of 46% sodium nitrite solution. The diazonium salt which precipitates in crystalline form is filtered off and quickly added to an ice cold mixture of 200 parts of a 30% solution of sulphur dioxide in glacial acetic acid, 0.5 part of cupric chloride dihydrate in 50 parts of water and 10 parts of 37% hydrochloric acid. The diazonium salt decomposes whilst nitrogen is developed. After standing for 2 hours at room temperature, the solution so obtained is evaporated to dryness in the vacuum. The residue is dissolved in 80 parts of water and neutralised with caustic soda lye. The disodium salt of 4-methyl-benzophenone-3.4'-disulphonic acid is isolated by evaporating the solution to dryness.

35.2 parts of the disodium salt mentioned above are stirred for 2 hours at 105° with 300 parts of phosphorus oxychloride. The solution obtained is carefully poured into 250 parts of water, the temperature of which is kept at 30–35° by addition of ice at intervals. The 4-methyl-benzophenone-3.4'-disulphochloride which precipitates first as an oil soon crystallises and is filtered off, washed with water and prepared for further working by dissolving in 100 parts of chloroform.

The chloroform solution of the disulphochloride is poured into a mixture of 100 parts of alcohol and 100 parts of 25% aqueous ammonia solution. After being left to stand at 45° for 20 minutes, the solvents and excess ammonia are evaporated off whereupon the 4-methyl-benzophenone-3.4'-disulphonamide crystallises out. It is purified by recrystallising from diluted alcohol. M.P. 114°.

The following substituted benzophenone-3-sulphonamides for example can be produced in the ways described in the above examples:

4-chloro-benzophenone-3.3'-disulphonamide, M.P. 236°,
4-bromo-benzophenone-3.4'-disulphonamide, M.P. 229.5°,
4-methyl-2'-carboxy-benzophenone-3-sulphonamide, M.P. 202°,
4.4'-dichloro-benzophenone-3.3'-disulphonamide, M.P. 237°,
4.4'-dibromo-benzophenone-3.3'-disulphonamide,
4.4'-difluoro-benzophenone-3.3'-disulphonamide,
4.4'-dimethoxy-benzophenone-3.3'-disulphonamide, M.P. 292°,
4-chloro-4'-methyl-benzophenone-3-sulphonamide, M.P. 167–168.5°,
4-chloro-2'.4'-dimethyl-benzophenone-3-sulphonamide, M.P. 173–175°,
4-chloro-3'.4'-dimethyl-benzophenone-3-sulphonamide, M.P. 185°,
4-chloro-4'-methyl-benzophenone-3.3'-disulphonamide, M.P. 216–219°,
4-chloro-4'.6'-dimethyl-benzophenone-3.3'-disulphonamide, M.P. 222.5–225°,
4-chloro-4'-methoxy-benzophenone-3-sulphonamide, M.P. 161°,
4-chloro-4'-ethoxy-benzophenone-3-sulphonamide, M.P. 161°,
4-chloro-3'-methyl-4'-n-propoxy-benzophenone-3-sulphonamide, M.P. 186°,
4-chloro-2'-carbomethoxy-benzophenone-3-sulphonamide, M.P. 178.5–182°,
4-chloro-2'-carbethoxy-benzozphenone-3-sulphonamide, M.P. 150.5–153°,
4-chloro-2'-carbamylmethoxy-benzophenone-3-sulphonamide,
4-amino-2'-carbamylmethoxy-benzophenone-3-sulphonamide,
4-chloro-2'-(diethylcarbamyl-methoxy)-benzophenone-3-sulphonamide,
4-chloro-2'-(diallycarbamyl-methoxy)-benzophenone-3-sulphonamide,
4-chloro-4'-carbamyl-benzophenone-3-sulphonamide, M.P. 244–247°,
4-chloro-4'-carboxymethoxy-benzophenone-3-sulphonamide, M.P. 191–193.5°,
4-chloro-4'-carbamylmethoxy-benzophenone-3-sulphonamide, M.P. 233–237° (on decomposition),
4-chloro-4'-(dimethylcarbamyl-methoxy)-benzophenone-3-sulphonamide, M.P. 144.5–147°,
4-chloro-4'-(β-carbamyl-ethoxy)-benzophenone-3-sulphonamide,
4-chloro-4'-(β-diethylcarbamyl-ethoxy)-benzophenone-3-sulphonamide, and
4-chloro-2'.4'.6'-trimethyl-benzophenone-3-sulphonamide, M.P. 169°.

*Example 5*

26.1 parts of 4-chloro-3'nitrobenzophenone, 61 parts of 26% oleum and 190 parts of 100% sulphuric acid are heated to 140° and stirred for 5 hours at this temperature. The solution is poured into 700 parts of a mixture of water and ice the temperature of which is not allowed to rise above 50° by the further addition of ice. The 4-chloro-3'-nitro-benzophenone-3-sulphonic acid which crystallises out is filtered off under suction, dissolved in 400 parts of water and the solution is neutralised with caustic soda lye. The sodium salt which crystallises out is dried in the vacuum at 100°.

36.4 parts of the sodium salt are added to 77 parts of phosphorus oxychloride, and the whole is stirred for 3 hours at 100–105°. The reaction mass is poured into water the temperature of which is kept at 25–35° by the addition of ice, and the 4-chloro-3'-nitrobenzophenone-3-sulphochloride crystallises out. After filtering off and washing, it melts at 163–165°.

The sulphochloride is dissolved in 400 parts by volume of chloroform and the solution is poured into a mixture of 250 parts by volume of 25% aqueous ammonia and 500 parts by volume of ethanol. The solvent and excess ammonia are removed by the introduction of steam whereupon the 4-chloro-3'-nitro-benzophenone-3-sulphonamide crystallises out. After recrystallising from ethanol, it melts at 189–191°.

34.1 parts of the nitro compound so obtained are gradually added to a boiling mixture of 120 parts by volume of ethanol, 120 parts of water, 3 parts of concentrated hydrochloric acid and 31.3 parts of cast iron powder. The mixture is boiled for 12 hours, then made weakly alkaline with caustic soda lye, filtered hot and the residue is boiled out with ethanol. 4-chloro-3'-amino-benzophenone-3-sulphonamide is obtained from the combined filtrates. M.P. 175–176°.

31.1 parts of the amino compound so obtained are refluxed for 8 hours with 120 parts of glacial acetic acid. The 4-chloro-3'-acetamido-benzophenone-3-sulphonamide which crystallises out is filtered off after cooling and recrystallised from ethanol. M.P. 231–232°.

Starting from the corresponding sulphochlorides, 4-chloro - 3' - nitro - 4' - methyl - benzophenone-3-sulphonamide (M.P. 195–199°) and 4-chloro-3'-nitro-4'.6'-dimethyl-benzophenone-3-sulphonamide (M.P. 193–197°) are obtained in an analogous manner. On reducing the latter analogously, 4-chloro-3'-amino-4'.6'-dimethyl-benzophenone-3-sulphonamide (M.P. 168–170°) is obtained and, on acylating this compound, 4-chloro-3'-acetamido-4'.6' - dimethyl - benzophenone - 3 - sulphonamide (M.P. 218.5–220.5°) is obtained.

*Example 6*

31.1 parts of 4-chloro-3'-amino-benzophenone-3-sulphonamide are pasted in 100 parts of water and 11.2 parts of 96% sulphuric acid and diazotised at 0–10° within 15 minutes with 15 parts by volume of a solution of 46 parts by volume percent of sodium nitrite. The solution of the diazonium salt is poured into 200 parts of 5% sulphuric acid. The 4-chloro-3'-hydroxybenzophenone-3-sulphonamide precipitates in an oily form and is washed with water until it crystallises. The crude product is purified by dissolving with sodium carbonate solution, again precipitating with hydrochloric acid and subsequent recrystallisation from chlorobenzene. M.P. 133°.

*Example 7*

31.1 parts of 4-chloro-3'-amino-benzophenone-3-sulphonamide are dissolved in 200 parts of glacial acetic acid and 20 parts by volume of concentrated hydrochloric acid. After some time, the hydrochloride crystallises out in the form of a thick slurry. After the addition of 50 parts of water, the whole is diazotised at 0–15° with 16 parts by volume of an aqueous solution of 46% by volume of sodium nitrite, the diazotisation being performed within 10 minutes. The clear solution of the diazonium salt is poured into a mixture of 100 parts of a 30% solution of sulphur dioxide in glacial acetic acid, 2 parts of cupric chloride dihydrate and 10 parts of water whereupon the diazonium salt decomposes within 5 to 10 minutes under nitrogen development. After the addition of 500 parts of water, the 4-chloro-3-benzophenone-3-sulphonamide-3'-sulphochloride precipitates in the form of an amorphous mass which crystallises on kneading under water.

The sulphochloride is dissolved in 100 parts of acetone and the solution is poured into 100 parts of aqueous 25% ammonia. The acetone and excess ammonia are removed after 30 minutes on the introduction of steam. The 4-chloro-benzophenone-3.3'-disulphonamide crystallises out. The compound, recrystallised from ethanol, melt at 236°.

The following compounds are obtained in an analogous manner on using the corresponding amines instead of ammonia:

4-chloro-3'-ethyl sulphamyl-benzophenone-3-sulphonamide, M.P. 213°, 4-chloro-3'-diethylsulphamyl-benzophenone-3-suphonamide, M.P. 163°, 3-sulphamyl-4-chloro-benzophenone-3'-sulphonic acid piperidide, 3-sulphamyl-4-chloro-benzophenone-3'-sulphonic acid morpholide, and 4-chloro-3'-(3-hydroxyethylsulphamyl)-benzophenone-3-sulphonamide, M.P. 149°.

In the latter case, the excess amine is removed with diluted hydrochloric acid.

Example 8

31 parts of 4-chloro-4'-methyl-benzophenone-3-sulphonamide are dissolved in 220 parts by volume of 2 N-caustic soda lye and the solution is heated to about 95°. 37 parts of potassium permanganate are added while stirring to this solution within 1 hour and the whole is again stirred until the solution becomes greenish coloured. A few parts by volume of concentrated sodium bisulphite solution are then added until the reaction solution, apart from the manganese dioxide precipitate, is clear. A little animal charcoal is added and the mixture is filtered under suction over hyflo and concentrated hydrochloric acid is added to the hot solution. The precipitate obtained on cooling is filtered off under suction, washed, dissolved in sodium bicarbonate solution and the solution is filtered. On acidifying the filtrate the 4-chloro-4'-carboxybenzophenone-3-sulphonamide is obtained in a pure form. On recrystallising from glacial acetic acid, acetic acid or water, it can be further purified and then melts at 277–278.5° on slight decomposition.

In an analogous manner, on oxidising 4-chloro-3'-methyl-4'-n-propoxy-benzophenone - 3 - sulphonamide, 4-chloro-3'-carboxy-4'-n-propoxy - benzophenone - 3 - sulphonamide (M.P. 188°) is obtained and on oxidising 4-chloro-3'-nitro - 4' - methyl - benzophenone - 3 - sulphonamide, 4-chloro-3'-nitro-4'-carboxy-benzophenone-3-sulphonamide (M.P. 213–225° on decomposition) is obtained. 4-chloro-3'-amino - 4' - carboxy-benzophenone-3-sulphonamide (M.P. 273°) is obtained by reducing the latter analogously to Example 5.

Example 9

32.6 parts of 4-chloro-2'-carboxy-diphenylmethane-3-sulphonamide (M.P. 194.5°), which can be easily produced by reducing 4-chloro - 3 - amino-benzophenone-2'-carboxylic acid with zinc dust and ammonia and converting the amino group into the sulphamyl group according to the process mentioned several times in the above examples, are dissolved in 400 parts of 1% caustic soda lye. The solution is oxidised at 90–95° by the gradual addition of 520 parts of a 5% aqueous solution of potassium permanganate. After the addition of a little sodium bisulphite the precipitated pyrolusite is filtered off. On acidifying the filtrate with hydrochloric acid, 4-chloro-2'-carboxy-benzophenone-3-sulphonamide is precipitated. On recrystallising from water, it melts at 223°.

Example 10

100 parts of finely pulverised 4-chloro-3-sulphamyl-benzophenone-2'-carboxylic acid chloride are suspended in 100 parts by volume of chloroform and the suspension is slowly added, while cooling, to 200 parts by volume of diethylamine. The mixture is stirred from some time, then heated to 40° and the liquid portions are removed at this temperature in the vacuum. The residue is dissolved in warm water and the solution is acidified. The precipitate is filtered off under suction, washed with water and with sodium bicarbonate solution while milling and stirring in order to remove the little carboxylic acid formed, and again is washed with water. The 4-chloro-2'-diethyl carbamyl-benzophenone-3-sulphonic acid amide obtained is purified by recrystallising from 50% acetic acid and then melts at 202–204°.

4-chloro-2'-dimethylcarbamyl-benzophenone-3-sulphonamide, M.P. 173–175°, is produced in an analogous manner.

The present application is a division of copending application, Serial No. 795,616, filed February 26, 1959, which is itself a continuation-in-part of application Serial No. 770,946, filed October 31, 1958 (abandoned since the filing of Serial No. 795,616).

What we claim is:

1. A benzophenone sulphonamide of the formula

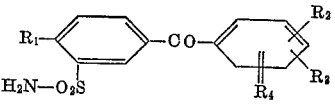

wherein:

$R_1$ is a member selected from the group consisting of chlorine, bromine, amino, lower alkyl and lower alkoxy, $R_2$ is a member selected from the group consisting of hydrogen, chlorine, bromine, —COOH, lower alkyl, lower alkoxy,

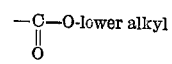

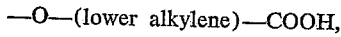

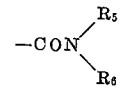

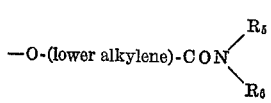

and

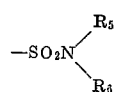

$R_3$ is a member selected from the group consisting of hydrogen, chlorine, bromine, nitro, hydroxy, lower alkyl, lower alkoxy, —COOH,

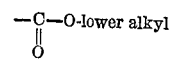

—O—(lower alkylene)—COOH, —NH$_2$, lower alkanoylamino,

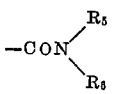

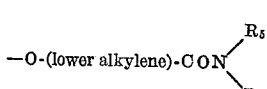

and

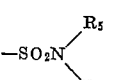

$R_4$ is a member selected from the group consisting of hydrogen, chlorine, bromine, lower alkyl and lower alkoxy, and each of R$_5$ and R$_6$ taken separately is a member selected from the group consisting of hydrogen, lower alkyl, lower alkenyl, lower hydroxyalkyl and R$_5$ and R$_6$ together with the corresponding nitrogen atom are a member selected from the group consisting of pyrrolidino, piperidino and morpholino.

2. 4-chloro-2'-,4',6'-trimethyl-benzophenone-3-sulphonamide.
3. 4.4'-dichloro-benzophenone-3.3'-disulphonamide.
4. 4-chloro-benzophenone-3.4'disulphonamide.
5. 4-chloro-4'carboxymethoxy - benzophenone - 3 - sulphonamide.
6. 4-chloro-4'-n-propoxy-3'-carboxy - benzophenone-3-sulphonamide.
7. 4-methyl-benzophenone-3.4'-disulphonamide.
8. 4-bromo-benzophenone-3.4'-disulphonamide.
9. 4-chloro-4'-methoxy-benzophenone-3-sulphonamide.
10. 4-chloro-4'-methyl-benzophenone-3-sulphonamide.
11. 4-chloro-3'-hydroxybenzophenone-3-sulphonamide.
12. 4-chloro-2'-diethylcarbamyl-benzophenone - 3 - sulphonamide.

References Cited in the file of this patent

UNITED STATES PATENTS 2,860,165    Schraufstatter ---------- Nov. 11, 1958

OTHER REFERENCES

Graf et al.: Helv. Chima Acta, pp. 1085–1095 (1959).